United States Patent [19]

Plazier

[11] Patent Number: 4,933,006
[45] Date of Patent: Jun. 12, 1990

[54] METHOD FOR THE BATCH PRODUCTION OF STEEL IN AN OXYGEN STEEL CONVERTER WITH SCRAP INPUT

[75] Inventor: Nico Plazier, Castricum, Netherlands

[73] Assignee: Hoogovens Groep B.V., Ijmuiden, Netherlands

[21] Appl. No.: 370,997

[22] Filed: Jun. 26, 1989

[30] Foreign Application Priority Data

Jul. 11, 1988 [NL] Netherlands ..................... 8801748

[51] Int. Cl.⁵ .............................................. C21C 7/00
[52] U.S. Cl. ........................................ 75/532; 75/581
[58] Field of Search ..................... 75/51.5, 59.23, 44 S

[56] References Cited

U.S. PATENT DOCUMENTS

| | | | |
|---|---|---|---|
| 2,803,534 | 8/1957 | Cuscoleca | 75/59.23 |
| 3,684,539 | 8/1972 | Bartholomew | 75/51.5 |
| 3,749,567 | 7/1973 | Stephenson | 75/51.5 |
| 4,242,126 | 12/1980 | Freissmith | 75/51.5 |
| 4,270,949 | 6/1981 | Esposito | 75/51.5 |

*Primary Examiner*—Peter D. Rosenberg
*Attorney, Agent, or Firm*—Stevens, Davis, Miller & Mosher

[57] ABSTRACT

In a batch production of steel, a charge including solid scrap is loaded into an oxygen steel converter, the scrap is melted and the charge is refined in the converter by means of an oxygen blowing lance inserted into the converter through the converter mouth. To enable larger quantities, i.e. over 30% of scrap to be used, the solid scrap is heated by combustion of fuel in the converter using the oxygen blowing lance whose outlet is, at least initially, below the top level of the scrap in the converter, so that the combustion gases formed by the combustion of the fuel pass upwardly through the scrap.

20 Claims, 4 Drawing Sheets

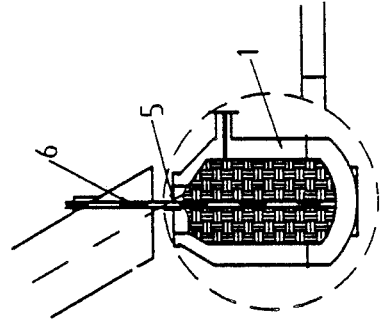
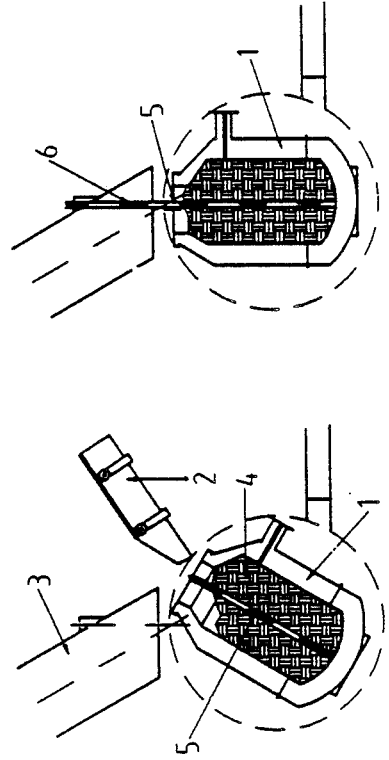
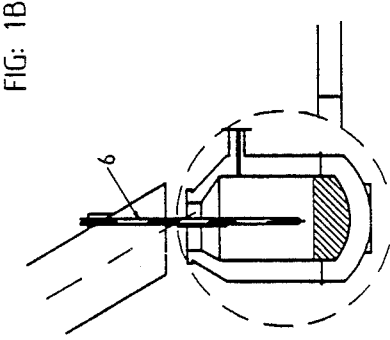
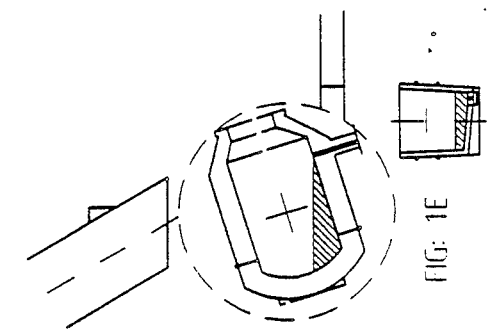
FIG. 1A
FIG. 1B
FIG. 1C
FIG. 1D
FIG. 1E

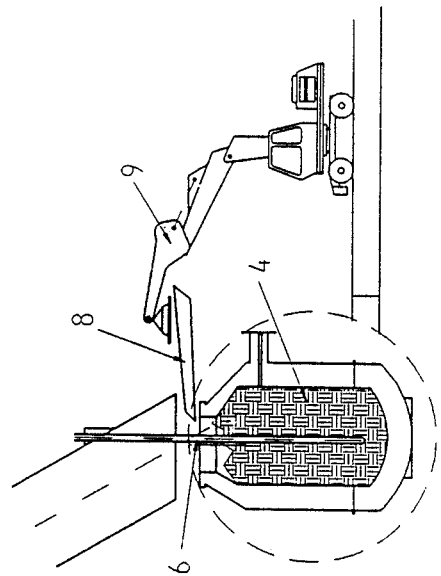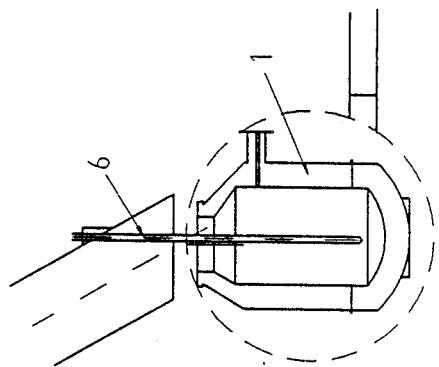
FIG: 2A
FIG: 2B

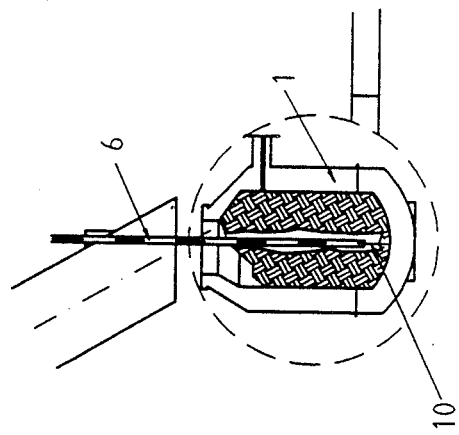
FIG: 3B
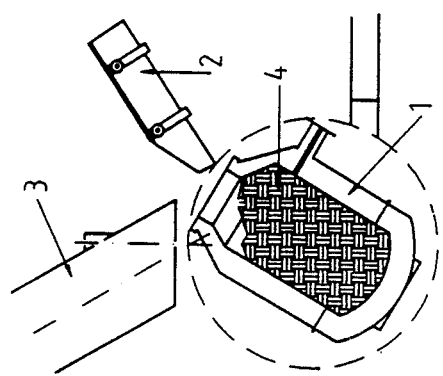
FIG: 3A

METHOD FOR THE BATCH PRODUCTION OF STEEL IN AN OXYGEN STEEL CONVERTER WITH SCRAP INPUT

BACKGROUND OF THE INVENTION

1. Field of the Invention

The invention relates to a method for the batch production of steel in an oxygen steel converter, in which a charge comprising solid scrap is loaded into the converter, the scrap is melted and the charge is refined in the converter by means of an oxygen blowing lance, which is inserted into the converter through its mouth. Finally the steel is tapped out of the converter.

2. Description of the Prior Art

The above paragraph describes the classical oxygen steel process, which is used on a large scale worldwide. In this process, the percentage by weight of the scrap in the charge is confined within narrow limits, and lies in the range from 20% to 30% maximum. This known process forms the basis for the present invention.

For a long time there has been a need for more freedom in the use of scrap and pig iron raw materials in the oxygen steel process, particularly with a view to a higher scrap content, for example in the event of a pig iron shortage or low scrap prices.

From Stahl und Eisen 101 (1981), page 639, there is known the KS process, in which a higher scrap input is used in an OBM converter. In this very special type of converter, fuel and oxygen are fed in through the bottom of the converter in order to cause the scrap to melt. However, most oxygen steel converters are not equipped for the supply of fuel and oxygen through the bottom of the converter in the quantities needed for scrap melting. With an OBM converter, there can also be problems in supplying fuel and oxygen in sufficient quantities through the trunnions of the converter. However, if fuel and oxygen are not fed via the trunnions, tilting of the converter is impeded.

The KVA process is known from EP-A-0240485, in which scrap is melted in a shaft furnace, then tapped off and finally refined in a converter. This process requires high investment for the shaft furnace and special provisions for scrap supply and for holding the molten scrap at temperature. Likewise, DE-B-1800610 describes melting of scrap in a separate furnace vessel, using a burner lance whose lower end is at the bottom of the vessel.

DE-A-1433452 and DE-A-2759129 illustrate processes in which a solid charge in a converter is heated from on top.

SUMMARY OF THE INVENTION

The object of the invention is to provide a method of steel production in which without high investment costs being necessary, it is possible in a normal oxygen steel converter to use a high content of scrap in the charge, which content may be varied according to need.

In accordance with the invention, the amount of solid scrap in the charge is at least 30% by weight, and the solid scrap is heated by combustion of fuel in the converter using the oxygen blowing lance whose outlet is, at least initially, below the top level of the scrap in the converter, so that the combustion gases formed by the combustion of the fuel pass upwardly through the scrap.

Preferably more than 35% by weight of solid scrap, e.g. more than 40% is used. The advantage of the method in accordance with the invention is that in a normal oxygen steel converter (e.g. according to the LD/BOF process) which employs an oxygen lance inserted through the converter mouth, high scrap input percentages may be used, which may vary over the range from 30% scrap up to, in principle, 0% pig iron. Because the oxygen blowing lance extends into the charge, the heat needed for pre-heating and, optionally melting, is supplied down in the charge. The combustion gases flow through the scrap in the converter and heat it in an efficient way before the melting stage begins. The carbon present in the fuel largely prevents the iron from burning. With the method in accordance with the invention, a normal oxygen steel converter may be used without any modifications to it being necessary. In some of the preferred embodiments of the invention described below, means for enabling the lance to be introduced without hindrance to a sufficiently deep point into the converter filled with scrap are employed.

By way of summary, advantages obtainable with the invention, over known processes may be stated as follows:

1. The method in accordance with the invention may be interchanged with the normal oxygen steel process in a very short time.
2. There is great flexibility in selection of the scrap/pig iron ratio.
3. The invention may be applied in any steel works that possesses a normal oxygen steel converter.
4. Negligible investment may be required.
5. There is great flexibility in the choice of fuel; no coal preparation for pulverized coal is needed as with the KS process.

The scrap may be fully melted by the fuel combustion using the oxygen lance. However, it has been found that the burning of fuel may in dependency of the scrap rate cease before the scrap is fully melted, e.g. at a scrap rate of 45% when the scrap reaches a temperature of 950°–1050° C. This is easily performed when the fuel e.g. a gas is supplied by the oxygen lance, which may then take the form of an oxy-fuel lance. Further heating of the scrap, melting of the scrap and refining of the bath can take place by burning of the carbon in the pig iron.

The level at which the lower (burner) outlet end of the lance is located, when the fuel burning to heat the scrap starts, should be sufficiently low down in the scrap to heat it fully. Preferably this level is below the mid-point of the scrap height, more preferably at less than 30% of the scrap height.

In a first embodiment of the invention, a protective tube for the oxygen lance is located in the converter before the solid scrap is loaded into the converter, and after the scrap has been loaded the oxygen lance is inserted down the protective tube into its desired position for heating the scrap.

Suitably, the lance may be lowered into the tube with a little play.

With this embodiment, the sequence of events may be, for example, as follows:

(a) Where solid fuel is being used, the fuel is loaded.
(b) Then the protective tube is placed into the converter, for example when the converter mouth is facing the charging floor. The top of the protective tube is already closed off or is closed off by a screw plug. The tube may be held in position during scrap charging.

(c) Then the scrap is loaded, with the top of the tube closed.

(d) Once the screw plug is removed, for example burned away, the lance drops into the melting position, whereafter with oxygen supplied the solid fuel ignites, and heats the charge. The protective tube may melt in with the scrap and become included in the charge.

The following may be said about the protective tube. It may have a length which roughly corresponds with the height of the converter. The inside diameter of the tube is somewhat bigger than the outside diameter of the lance. The protective tube may be held in the correct position by being supported against, for example, the upper edge of the converter lining. This support may be carried out in a similar manner to the opening and closing mechanism of an umbrella. The protective tube may be placed in a free horizontal position of the converter. Via a locking device the "umbrella" may be opened through the effect of gravity. The protective tube may be placed into the converter by scrap cranes. It is also possible to allow the protective tube to rest on the bottom of the converter, and it may be located on the bottom of the converter using centering means.

Alternatively, once the scrap charge is in after the lance has been lowered in, but before the lance is ignited, the protective tube may be removed from the converter, e.g. by lifting it up so that it may be re-used. To this end, and also to prevent premature melting of the protective pipe, it may be clad by refractory material, for example in the form of a sprayed-on coating or in the form of rings in the manner of a stopper rod.

In a second embodiment of the invention, the oxygen lance is inserted into the converter before the solid scrap is loaded into the converter and thereafter the solid scrap is loaded into the converter. It has been found that the oxygen lance can resist the mechanical shocks applied to it during loading of the scrap. Scrap charging may in this case take place via an existing bunker system or via the gap between the converter mouth and the exhaust hood. Since the blowing lance is lowered into the converter before the loading of the scrap, no protective tube is needed. However, the procedure to be followed in charging may deviate from the conventional procedure. Thus it may be necessary to load the scrap with the converter tilted only slightly from its upright position, unless the converter is adapted for scrap loading in its fully upright (blowing) position.

In a third preferred embodiment of the invention, after the solid scrap is loaded into the converter, a channel for the insertion of the oxygen lance is made in the scrap in the converter by means of a torch and the oxygen lance is inserted into the channel to the desired position for heating the scrap. The torch may be, for example, an oxygen/natural gas torch or a thermit lance, but is preferably a plasma torch. It has been found that a channel may be melted rapidly into scrap using a plasma torch. The torch may be introduced into the converter with a separate lnce, but also by means of a modified oxygen blowing lance. It is even possible to consider introducing the plasma torch from below through the bottom of the converter, but this has certain consequences on the design of the converter bottom. Furthermore, it is possible to make the channel using the normal oxygen blowing lance, and in this case, an ignition aid has to be used for ignition of the lance.

The type of fuel to be used for heating the scrap in the invention may be solid, liquid or gas. With solid fuel in the form of pieces, this is loaded into the converter as a part of the charge. Coke may, for example be used as solid fuel, having a piece size such as for example pea coke which is not suitable for pig iron production and for example in a quantity of about $$K = 0.25S - 0.04RY,$$

where K, S and RY are respectively the quantity of coke, scrap and pig iron in tonnes which are loaded into the converter. The coke is loaded into the converter preferably before the scrap, and the oxygen blowing lance is preferably lowered into the converter down to the level of the coke.

When using fuel which is in the form of powder, liquid or gas, this is preferably introduced into the converter during blowing by means of the oxygen blowing lance, e.g. in a version of a type known as an oxyfuel-lance.

It is preferable first to load an amount of liquid pig iron, preferably in a quantity of at least 10% to encourage ignition of the fuel and initial melting of the first scrap. The amount of pig iron used may be higher and may be substantially all of the charge except for the scrap (and any solid fuel used).

BRIEF INTRODUCTION OF THE DRAWINGS

Embodiments of the invention will now be described by way of non-limitative examples with reference to the drawings, in which:

FIG. 1 shows diagrammatically process stages in a first embodiment of the invention.

FIG. 2 shows diagrammatically some process stages in a second embodiment of the invention.

FIG. 3 shows diagrammatically some process stages in a third embodiment of the invention.

DESCRIPTION OF THE PREFERRED EMBODIMENTS

Figure 4A:
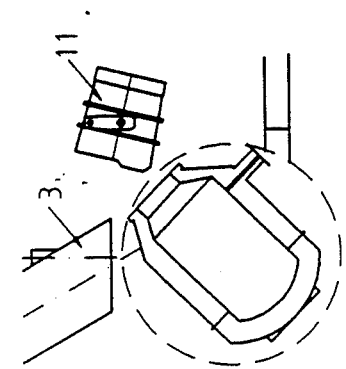
FIG. 4 shows diagrammatically process stages in a fourt embodiment of the invention.
Figure 4B:
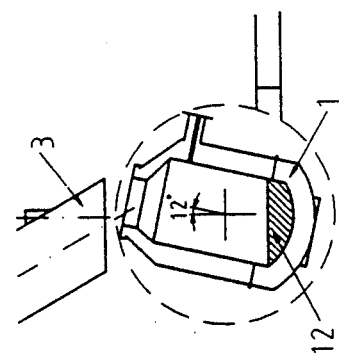
Figure 4C:
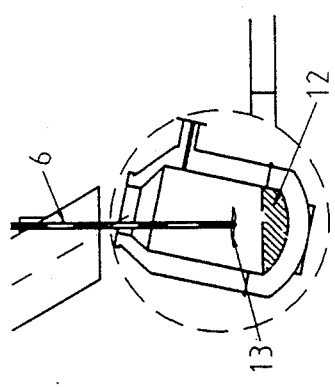

FIG. 1A shows the charge loading stage in which a tiltable oxygen steel converter 1 in its charging position, with its mouth tilted away from the gas exhaust 3, is being loaded by a scrap bin 2. The exhaust 3 is part of apparatus for discharging the gas that escapes from the mouth of the converter 1 during blowing. This converter is thus of a conventional type. In FIG. 1A the converter is shown already nearly completely filled with a charge of pig iron (not separately shown), coke (not separately shown) and scrap 4. A protective pipe 5 is placed into the converter, which pipe rests on the bottom of the converter and extends up close to the upper end of the converter.

The converter has a conventional oxygen lance 6 which is insertable through the converter mouth at the centre of the converter when the converter is in the upright (blowing) position.

In FIG. 1B the converter 1 is in the blowing position and the oxygen blowing lance 6 is inserted into the protective pipe 5 and lowered right down into the converter, to a level close to the liquid pig iron and coke, i.e. close to the bottom level of the scrap. The lance 6 has its burner outlet at its lower end.

FIG. 1C shows the melting stage in which the scrap 4 is heated and melted by combustion gases produced by burning of the coke by means of oxygen supplied through the lance 6. Down inside the converter molten scrap 7 mixed with pig iron has gathered. The protective pipe has already been absorbed into the melt. The combustion gases pass upwardly through the scrap from the combustion zone, and heat the scrap.

In FIG. 1D the charge is refined and superheated by the oxygen blowing lance 6 in a conventional manner.

In FIG. 1E the converter is being tapped, again conventionally.

FIGS. 2 to 4 show alternative embodiments in which again a conventional oxygen steel converter 1 and oxygen blowing lance 6 are used.

FIG. 2A shows the first stage of the second embodiment of the invention in which the oxygen blowing lance 6 is lowered into the empty converter with the converter 1 in its blowing position. As shown in FIG. 2B the converter is then loaded with scrap 4 by means of a scrap loading apparatus comprising a chute 8 and a mobile electromagnet 9. The lance 6 can withstand the shocks arising during this loading. The remaining stages of this preferred embodiment of the method correspond to FIGS. 1C, 1D and 1E.

FIG. 3A shows the first stage of the third embodiment of the invention, in which the converter 1 is loaded in its charging position with scrap 4 by a scrap bin 2. In FIG. 3B, by means of a torch (not shown) a vertical channel 10 has been made in the scrap charge 4 in the converter, into which the oxygen blowing lance 6 is then lowered down to the desired depth in the charge in the converter. The remaining stages of this embodiment correspond to FIGS. 1C, 1D and 1E.

In the embodiment of FIG. 4, first in FIG. 4A the converter 1 is loaded in its charging position with liquid pig iron (55 tons) from a ladle 11. Then, as shown in FIG. 4B, with the pig iron bath 12 present, the converter is rotated up almost to its fully upright (blowing) position, in fact to 12° from the upright. Next, FIG. 4C, the oxygen lance 6 is lowered to a position where its lower end (i.e. burner end) is closed to the surface of the pig iron 12 and is ignited and its flame 13 is allowed to burn at its pilot capacity (flame maintenance level). Gaseous fuel (natural gas) is supplied as well as oxygen by the lance 6 which is of the conventional oxy-fuel type in this case. This ignition is performed at this stage because it may be difficult to ignite the lance later and to avoid risk of explosion.

Figure 4D:
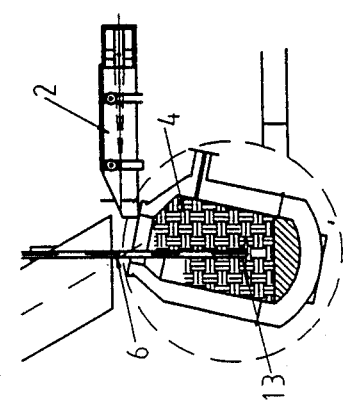
Figure 4E:
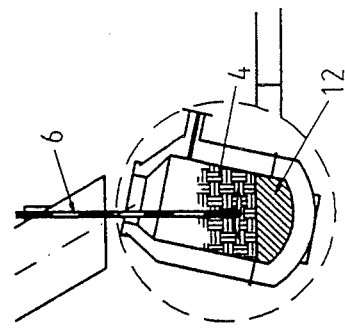
Figure 4F:
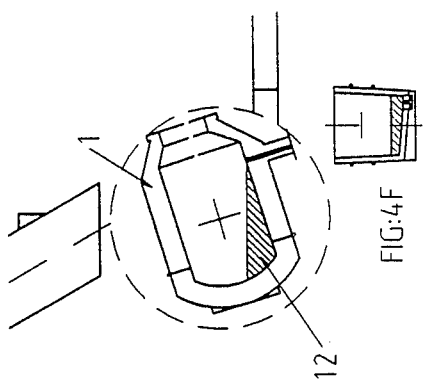

Then, as shown in FIG. 4D, at the same position of the converter, 45 tons of scrap are charged into the converter from scrap bins 2. The lance flame is then increased in power to nominal capcity and the scrap is heated by the combustion gases so produced which pass up through the scrap and out of the converter through its mouth (FIG. 4E). When the scrap reaches the temperature of 1000° C., the natural gas supply is cut off and the process continues as a normal oxygen steel melting and refining process, with the scrap being further heated and melted by the burning of the carbon in the pig iron. After the addition of the scrap (FIG. 4D) or after melting of scrap the converter may be brought to its fully upright, vertical position. When the steel has reached the desired quality, it is tapped from the converter (FIG. 4F).

What is claimed is:

1. In a method of batch production of steel in which a charge including solid scrap is loaded into an oxygen steel converter, the scrap is melted and the charge is refined in the converter by means of an oxygen blowing lance inserted into the converter through the converter mouth, the improvement comprising heating the amount of solid scrap in the charge of at least 30% by weight by combustion of fuel in the converter using the oxygen blowing lance whose outlet is below the top level of the solid scrap in the converter until the solid scrap is melted, so that the combustion gases formed by the combustion of the fuel pass upwardly through the solid scrap.

2. The method according to claim 1 wherein the amount of solid scrap in the charge is more than 35% by weight.

3. The method according to claim 1 including locating a protecting tube for the oxygen lance in the converter before the solid scrap is loaded into the converter, and inserting the oxygen lance after the scrap has been loaded down the protective tube into its desired position for heating the scrap.

4. The method according to claim 1 including inserting the oxygen lance into the converter before the solid scrap is loaded into the converter and thereafter loading the solid scrap into the converter.

5. The method according to claim 4 wherein both the steps of inserting the oxygen lance and loading the solid scrap are performed with the converter in its blowing position.

6. The method according to claim 1 including making a channel in the solid scrap by means of a torch after loading the solid scrap into the converter for the insertion of the oxygen lance in the converter and inserting the oxygen lance into the channel to the desired position for heating the scrap.

7. The method according to claim 1 wherein said fuel which is burned to heat the scrap forms a part of the charge loaded into the converter.

8. The method according to claim 7 wherein the fuel is coke.

9. The method according to claim 8 wherein the coke is loaded into the converter before the scrap.

10. The method according to claim 1 wherein the fuel which is burned to heat the scrap is supplied via the oxygen lance.

11. The method according to claim 1 wherein in dependency of the scrap rate the combustion of the fuel stops before the scrap is completely melted.

12. The method according to claim 11 wherein at a scrap rate of 45% the combustion of the fuel stops when the scrap is at a temperature in the range 950°–1050° C.

13. The method according to claim 1 wherein liquid pig iron forms part of the charge loaded into the converter.

14. The method according to claim 13 wherein the pig iron is loaded into the converter before the scrap.

15. The method according to claim 13 wherein the amount of liquid pig iron in the charge is at least 10% by weight.

16. The method according to claim 1 wherein the scrap is pre-heated before loading into the converter.

17. A method of batch production of steel comprising the steps of
(i) loading a charge comprising solid scrap in an amount of at least 30% by weight into an oxygen steel converter through a mouth of the converter,
(ii) melting said scrap in the converter by heating it, which heating is at least partly performed by burning fuel in the converter by means of an oxygen lance having an outlet inserted through the mouth of the converter, said lance having its outlet located below the top level of the scrap in the converter until the scrap is melted so that combustion gases produced by burning said fuel pass upardly through the scrap, and (iii) refining the molten charge in the converter by means of the oxygen lance and obtaining the desired steel composition.

18. The method of batch production of steel from a raw material charge comprising solid scrap, using an oxygen steel converter having a mouth and having an oxygen blowing lance insertable into the converter through said mouth, said method comprising the steps of (i) locating a protective tube for the oxygen lance in the converter at a predetermined position, (ii) after step (i), loading said solid scrap into the converter, the scrap content in the charge being at least 30% by weight, (iii) after step (ii), inserting the oxygen lance into the protective tube so that a burner of the lance comes to a position below the upper level of the scrap in the converter, (iv) melting the scrap by heating it, this heating being at least partly performed by burning fuel in the converter by means of the oxygen lance so that the combustion gases so formed pass upwardly through the scrap, whereby the scrap is heated, (v) refining the molten charge in the converter by means of the oxygen lance, (vi) tapping steel from the converter.

19. The method of batch production of steel from a raw material charge comprising solid scrap, using an oxygen steel converter having a mouth and having an oxygen blowing lance insertable into the converter through said mouth, said method comprising the steps of (i) inserting the oxygen lance into the converter to a predetermined position, (ii) after step (i), loading said solid scrap into the converter so that the top level of the scrap is above the lance outlet the content of the solid scrap in the charge being at least 30% by weight, (iii) melting the scrap by heating it, this heating being at least partly performed by supplying fuel via the oxygen lance and burning the fuel by means of the lance in the converter so that the combustion gases pass upwardly through the scrap, whereby the scrap is heated, (iv) refining the molten charge in the converter by means of the oxygen lance, (v) tapping steel from the converter.

20. The method according to claim 19, wherein prior to step (i) liquid pig iron, is loaded into the converter, and in step (i) the oxygen lance outlet is brought close to the liquid pig iron in the converter.

* * * * *